July 17, 1923.

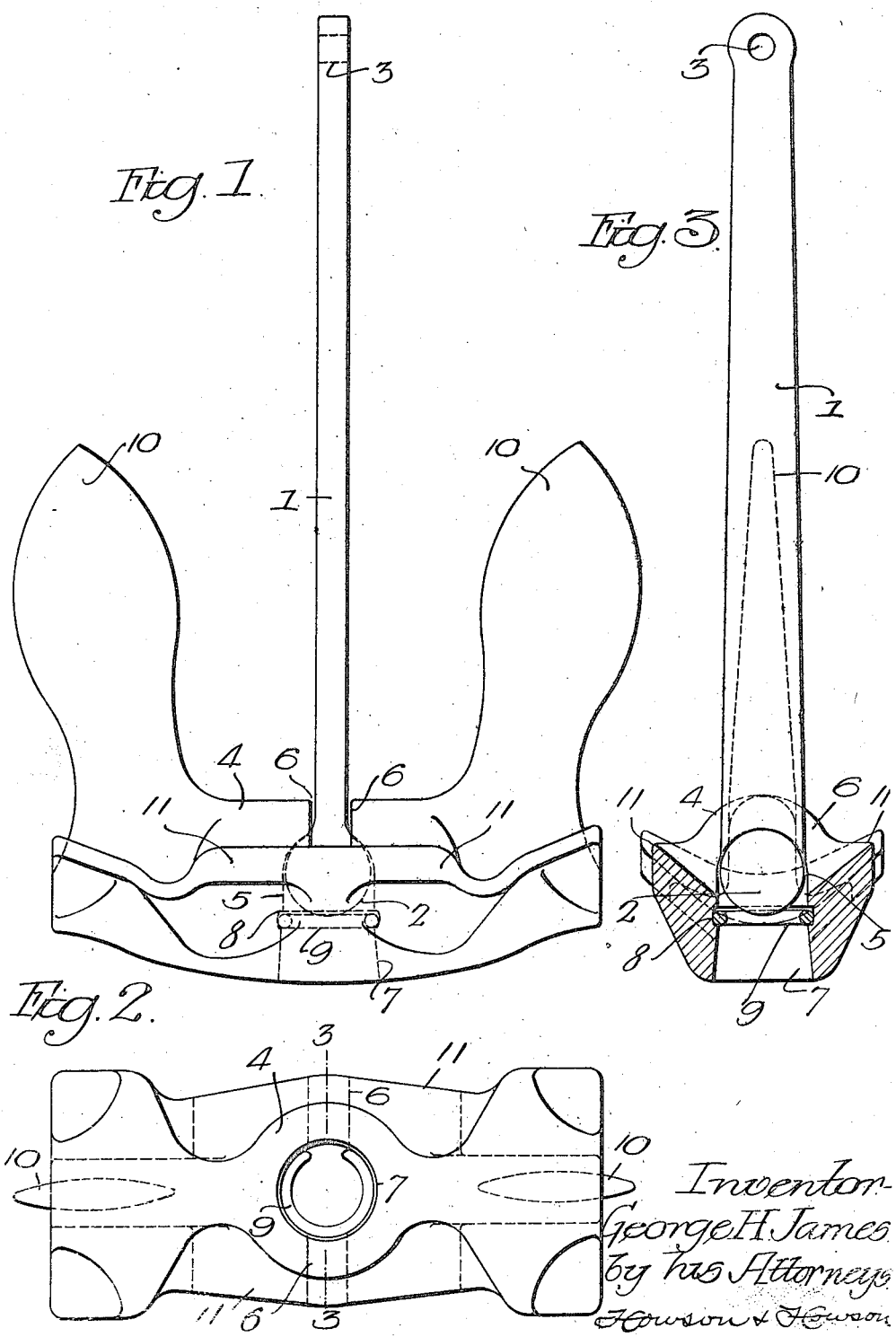

G. H. JAMES

ANCHOR

Filed Oct. 15, 1921

Inventor-
George H. James.
by his Attorneys
Howson & Howson

Patented July 17, 1923.

1,462,342

UNITED STATES PATENT OFFICE.

GEORGE H. JAMES, OF PHILADELPHIA, PENNSYLVANIA, ASSIGNOR TO AMERICAN ENGINEERING COMPANY, OF PHILADELPHIA, PENNSYLVANIA, A CORPORATION OF PENNSYLVANIA.

ANCHOR.

Application filed October 15, 1921. Serial No. 507,929.

*To all whom it may concern:*

Be it known that I, GEORGE H. JAMES, a citizen of the United States, residing in Philadelphia, Pennsylvania, have invented the Anchor, of which the following is a specification.

One object of this invention is to provide novel means for securing the headed end of a shank to the body of an anchor, which means shall be relatively simple, inexpensive, substantial and of such a nature as to permit of the convenient and rapid assembly of the anchor parts.

I further desire to provide an anchor of the type above indicated with novel means whereby the points of its flukes shall be depressed and forced into the sea bed under conditions of use.

The invention further contemplates a novel form of anchor which shall involve a minimum number of parts so formed and assembled as to permit rotative movement of the flukes on an axis at right angles to the shank of the anchor.

These objects and other advantageous ends I attain as hereinafter set forth, reference being had to the accompanying drawings, in which, Figs. 1 and 2 are respectively a side elevation and an inverted plan of an anchor constructed in accordance with my invention;

Fig. 3 is a transverse section on the line 3—3, Fig. 2;

Figure 4:
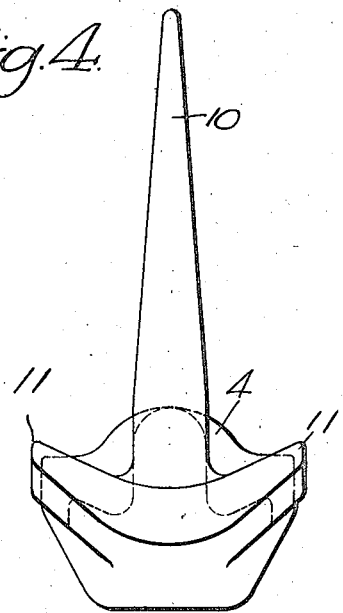
Fig. 4 is an end elevation of the body of the anchor.
Figure 5:
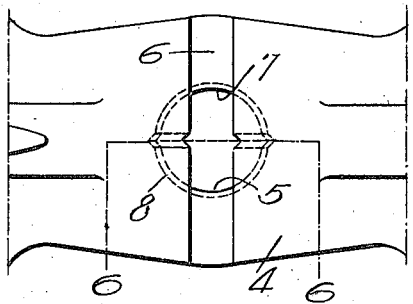
Fig. 5 is a fragmentary plan of the body of the anchor.
Figure 6:
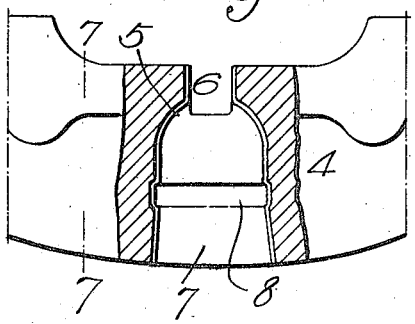
Fig. 6 is an elevation, partly in vertical section, on the line 6—6, Fig. 5.
Figure 8:
Fig. 8 is a plan of the spring retaining ring forming part of my invention.
Figure 7:
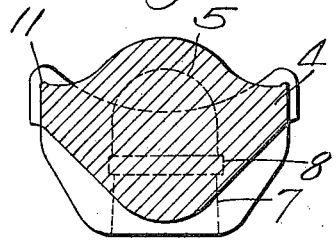
Fig. 7 is a transverse section on the line 7—7, Fig. 6.

In the above drawings 1 represents the shank of the anchor which is illustrated as consisting of an elongated bar of substantially rectangular section having at one end a spherically curved head 2 and at its opposite end formed with an eye 3 for the reception of a rope or cable. The body 4 of the anchor is formed with a socket 5 having a spherically curved bearing therein for the reception of the head 2 and formed with an opening 6 of substantially rectangular section to permit of the more or less close passage of the rectangular part of the shank 1.

Opposite this opening 6 is a second and larger opening 7 of a diameter sufficient to permit of the passage into the socket of the spherical head 2 and having in its walls an annular recess 8 for the reception of a split ring 9 of steel or other suitable relatively resilient material. The ends of this ring are so far separated as to permit of its being compressed sufficiently to pass through the opening 7 into the recess 8 and its internal diameter is less than that of the ball shaped head 2 of the shank so that when sprung into place as shown in Figs. 1, 2 and 3 inclusive, it effectually retains said head in the socket. Owing to the cross section of the shank 1 and to the form of the smaller opening 6 in the body, the shank 1 is free to swing through an angle of about 90° in a plane including the axial line of the anchor body and if, as is usually the case, it has a slight play in the opening 6, it also has a slight universal movement relatively to said body.

At opposite ends of the body are pointed and slightly divergent flukes 10, while integral with the body and extending longitudinally on opposite sides thereof are two webs 11 having relatively sharp outer edges and projecting at angles of substantially 45° to the general plane of the flukes.

In assembling the parts of the anchor, the eye end of the shank 1 is passed into the opening 9 of the socket and through the opening 6 thereof so that the head 2 finally comes to a bearing on the spherically curved surface of said socket. Thereafter the ring 9 is sprung into the recess 8 so as to permanently retain the parts in their assembled positions, in which owing to the form and construction of the openings in the body of the anchor, the shank is free to swing relatively thereto through an angle of substantially 45° on either side of a central position.

Moreover under conditions of use one or the other of the webs 11 tends to dig into the sea bed as the anchor is dragged over the same, with the result that the points 10 of the flukes are forcibly swung down and are caused to likewise dig into and hold in said bed. Obviously there is no possibility of separation of the body and shank of the anchor which with the spring retaining ring are of a relatively simple and substantial construction.

I claim:

The combination in an anchor of a body formed with a socket having an annular recess in its wall, there being two openings into said socket of which one is circular and the other substantially rectangular in section; a shank having a head movably fitting the socket and including a portion of substantially rectangular section operative in the rectangular opening; with a spring ring in the annular recess normally holding the head in the socket.

GEORGE H. JAMES.